L. JENNINGS.
Gold Washer.
No. 6,410.
Patented May 1, 1849
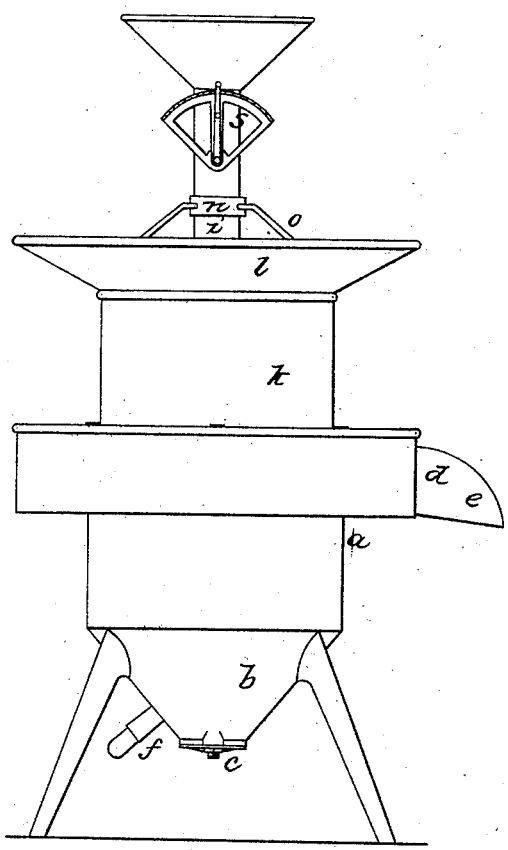
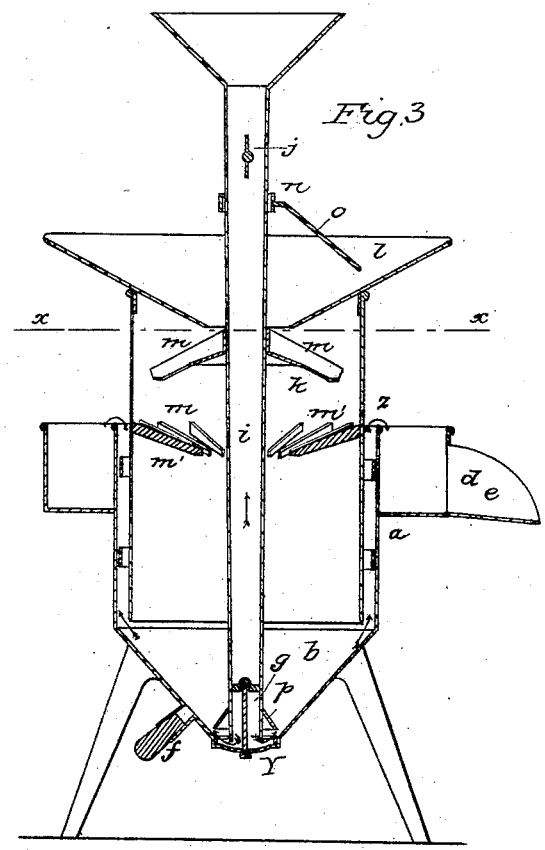
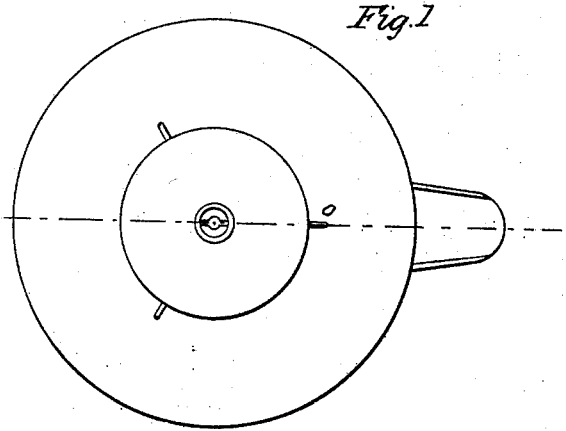
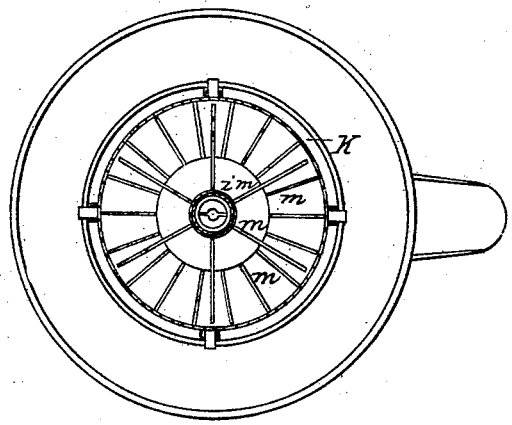

UNITED STATES PATENT OFFICE.

LEWIS JENNINGS, OF NEW YORK, N. Y.

GOLD-WASHER.

Specification of Letters Patent No. 6,410, dated May 1, 1849.

To all whom it may concern:

Be it known that I, LEWIS JENNINGS, of the city, county, and State of New York, have invented a new and useful Apparatus for Washing and Separating Gold from Earthy and other Foreign Matter, and that the following is a full, clear, and exact description of the principle or character which distinguishes them from all other things before known and of the manner of making, constructing, and using the same, reference being had to the accompanying drawings, making part of this specification, in which—

Figure 1, is a plan of the apparatus, Fig. 2, an elevation; Fig. 3, a vertical section; and Fig. 4, a horizontal section thereof taken at the line (X, X,) of Fig. 3.

The same letters indicate like parts in all the figures.

I effect the separation of the gold from the impurities in my apparatus by the force of a current of water acting on the gold and foreign matter with which it is mixed as these descend by the force of gravitation, the force of the current having the effect to carry over and discharge all matters that are of less specific gravity than the gold, which, by reason of its greater specific gravity, finally deposits at the bottom of the apparatus.

The principle or character of my invention and that which distinguishes it from all other things before known consists in the employment of a vertical tube or chamber, through which a current of water descends, which tube or chamber is connected with a second tube or chamber containing gold and foreign matters, there being a third or an outer vessel or chamber, with an inclined or curved bottom, so formed and located as to leave a space between it and the lower end of the first and second tubes or chambers, so that the current of water which passes down the first tube or chamber will escape below the lower edge thereof, and move toward the space between the second and the outer casing, so that the gold and all the foreign matters are in still water between the first and second where by gravity they descend without interruption, until they reach the outward current of water from the first tube or chamber, which acting on the gold and the foreign matter, has sufficient force to separate by washing the impurities from the particles of gold, the latter falling by their superior gravity into a cup formed receptacle below the first tube, while the foreign matters which are of less specific gravity are carried up by the current and are discharged over the upper edge of the outer casing.

In the accompanying drawings (a) represents the outer casing which is a vertical cylindrical vessel of any desired size with the bottom in the form of an inverted cone; at the lower end there is a hole to which is fitted a cup formed receptacle (b) attached thereto by screws and nuts (c, c,) so that it can be readily removed for taking out the gold. The upper edge of the said casing is surrounded by a discharge trough (d) with a delivery spout (e), so that the water and foreign matter washed over the upper edge will be delivered at the spout for convenience. The conical bottom is also provided with a spout and plug or stop cock (f) for the purpose of discharging the contents of this vessel when desired. In the center of the cup or receptacle (b) there is a vertical pin or pivot (g) on which rests a brace in and near the lower end of a vertical central pipe (i) for the purpose of supporting the said pipe so as to leave a space for the passage of water between the lower edge of the said pipe and the cup (b). The upper end of the pipe (i) is funnel shaped to receive a current of water from any source the force of the current through the pipe being regulated by a throttle valve (j) in the pipe and near the upper end of it, the said valve being governed by a lever (s) outside.

Within the outer casing and surrounding the central pipe there is a second pipe (k) which extends to a height above the rim of the outer casing, and down to within such a distance of the conical bottom as to leave a passage for the current of water. A hopper (l) is placed above the second pipe (k) into which the earthy matter containing particles of gold is to be supplied. The central aperture of this hopper is provided with radial bars (m') which extend inward nearly to the central pipe for the purpose of dividing the earthy matter before it falls down, the said central pipe being provided with like bars (m) and for the same purpose as, but a little above those attached to the hopper.

The central pipe is sustained near the top by a ring (n) with sustaining bars (o)

which are attached to the outer edge of the hopper, so that the said central pipe is susceptible of being turned when desired in case of any tendency to choke the apparatus, in which case the radial bars will tend to disengage the earthy matter which may have any tendency to adhere to the bars.

Near the lower end of the central pipe there is a conical flanch (*p*) which extends down to within a short distance of the conical bottom for the purpose of deflecting the earthy matter, etc., as it descends, that the outward current of water may have a better and more free action on it to effect the separation.

The apparatus is to be filled with water and a stream of water supplied to the central pipe by a pump or other means. The earthy matter containing gold is then supplied in the hopper, and all the particles not too large will pass down between the bars of the hopper and central pipe and will descend by gravity through the still water between the central pipe and surrounding second pipe, until it comes within the influence of the current of water from the bottom of the central pipe, along the conical bottom, toward the annular space between the second pipe and the outer casing. The force of this current will strike and carry all the particles of less specific gravity than gold toward and up the space between the second pipe and outer casing and discharge them over the edge into the surrounding trough, while the particles of gold which are gradually separated by the water from all foreign matter passes under the edge of the conical flanch on the central pipe and are deposited in the central cup or receptacle at the bottom, from whence they can be taken by removing the cup.

Although I have described and represented this apparatus as being of a conical form it will be evident that it may be made of any desired form, although I deem the circular the best adapted to the purpose.

And it will be seen that instead of making the second chamber to surround the first, and the third to surround the second, that the principle of my invention may be applied by making the three chambers, side by side, and in succession, and of any desired form, as the object is to have the matters to be operated upon and to be separated pass down in still water, until met by the current of water from one chamber to the discharge chamber.

What I claim as my invention and desire to secure by Letters Patent is—

The employment of a chamber or tube, through which a current of water is to flow, when this is combined with a second tube or chamber, which receives the gold and earthy matter, and the third or outer chamber, provided with a bottom so far below the partitions forming the first and second tubes or chambers, as to leave a space for the passage of water from the first tube or chamber to the discharge chamber or outer casing, substantially in the manner and for the purpose specified.

L. JENNINGS.

Witnesses:
 A. V. BROWNE,
 A. E. PETERS.